United States Patent
Tato et al.

(10) Patent No.: US 7,376,559 B2
(45) Date of Patent: May 20, 2008

(54) PRE-PROCESSING SPEECH FOR SPEECH RECOGNITION

(75) Inventors: Raquel Tato, Stuttgart (DE); Thomas Kemp, Esslingen (DE); Antoni Abella, Torrelameu (ES)

(73) Assignee: Sony Deutschland GmbH, Koeln (DE)

( * ) Notice: Subject to any disclaimer, the term of this patent is extended or adjusted under 35 U.S.C. 154(b) by 634 days.

(21) Appl. No.: 10/809,162

(22) Filed: Mar. 25, 2004

(65) Prior Publication Data

US 2004/0236570 A1 Nov. 25, 2004

(30) Foreign Application Priority Data

Mar. 28, 2003 (EP) .................................. 03007158

(51) Int. Cl.
- G10L 11/02 (2006.01)
- G10L 21/02 (2006.01)
- G10L 15/20 (2006.01)
- G10L 15/00 (2006.01)

(52) U.S. Cl. ........................................ 704/233; 704/206
(58) Field of Classification Search ................ 704/206, 704/208
See application file for complete search history.

(56) References Cited

U.S. PATENT DOCUMENTS

| | | | | |
|---|---|---|---|---|
| 5,583,784 A | * | 12/1996 | Kapust et al. ................. | 702/77 |
| 5,583,888 A | * | 12/1996 | Ono ........................... | 375/240 |
| 5,625,743 A | * | 4/1997 | Fiocca ........................ | 704/205 |

FOREIGN PATENT DOCUMENTS

WO    WO 02 095730    11/2002

OTHER PUBLICATIONS

K.K. Paliwal, 'On The Use of Filter-Bank Energies As Features For Robust Speech Recognition', Aug. 1999; pp. 641-644.*

Nadeu et al., 'Time and Frequency filtering of filter-bank energies for robust HMM speech recognition', Speech Communication 34 (2001) 93-114.*

Database Inspec 'Online! The Institution of Electrical Engineers, Stevenage, GB; Jiang Wen-Jian et al: "A differential hybrid subband method for noisy speech recognition" Database accession No. 7406613 XP002251485, Abstract.

(Continued)

*Primary Examiner*—Tālivaldis Ivars Šmits
*Assistant Examiner*—Justin W. Rider
(74) *Attorney, Agent, or Firm*—Oblon, Spivak, McClelland, Maier & Neustadt, P.C.

(57) ABSTRACT

A method for pre-processing speech, in particular for recognizing speech, including receiving a speech signal, separating a spectrum of said speech signal into a number of predetermined frequency sub-bands, analyzing said speech signal within each of said frequency sub-bands, generating respective band-dependent acoustic feature data for each of said respective frequency sub-bands, deriving band-dependent likelihoods for occurrences of speech elements or within said speech signal based on said band-dependent acoustic feature data, analyzing said speech signal within said spectrum, generating full-band acoustic feature data, which are at least in part representative for said speech signal with respect to said spectrum, deriving a full-band likelihood for occurrences of speech elements or of sequences thereof within said speech signal based on said full-band acoustic feature data, deriving an overall likelihood for occurrences of speech elements within said speech signal based on said band-dependent likelihoods and said full-band likelihood.

15 Claims, 4 Drawing Sheets

OTHER PUBLICATIONS

Nadeu C et al: "Time and frequency filtering of filter-bank energies for robust HMM speech recognition" Speech Communication, Apr. 2001, Elsevier, Netherlands, vol. 34, No. 1-2, pp. 93-114, XP002251486.

Ji Ming et al: "Union: a new approach for combining sub-band observations for noisy speech recognition" Speech Communication, Amsterdam, NL, vol. 34, No. 1-2, 2001, pp. 41-55, XP002209287.

Tibrewala S et al: "Sub-band based recognition of noisy speech" 1997 IEEE International Conference on Acoustics, Speech, and Signal Processing (Cat. No. 97CB36052), 1997 IEEE International Conference on Acoustics Speech, and Signal Processing, Munich, Germany, Apr. 21-24, 1997, pp. 1255-1258, vol. 2, XP010226029.

* cited by examiner

PRE-PROCESSING SPEECH FOR SPEECH RECOGNITION

BACKGROUND OF THE INVENTION

The invention relates to a method for pre-processing speech, in particular to a method for recognizing speech.

Automatic speech recognition systems are exposed to a wide range of additive noise, in terms of spectral characteristics. In a real environment, partial frequency-band corruptions, e.g. telephone, clock, etc., coexist with non-stationary noise, e.g. music, as well as with unknown broadband noise (e.g. car noise, conference background noise, etc.). Generally, there exist the following types of noises: broadband non-stationary noise, broadband stationary noise, narrow-band non-stationary noise, and narrowband stationary noise.

From a robust speech recognition point of view, it is desirable to have a system, which is able to deal with as many types of noise as possible. However, so far known methods applied within speech recognition in order to deal with noise can only deal well with one of the mentioned types of noise, e.g. with a specific method only non-stationary partial frequency band corruptions, i.e. narrowband noise, may be treated well, while broadband noise cannot be treated effectively with this specific method, which leads to poor recognition results if broadband noise occurs.

SUMMARY OF THE INVENTION

It is an objective of the invention to provide a method for pre-processing speech, in particular in a method for recognizing speech, which improves the recognition rate with respect to a speech signal which may be disturbed by any of partial frequency band corruptions, non-stationary noise, and/or broadband noise.

To achieve this objective, the invention provides a method for pre-processing speech, in particular in a method for recognizing speech. In addition, the invention provides a speech pre-processing system, in particular integrated into a speech processing system, a computer program product, and a computer readable storage medium. Further features and preferred embodiments are respectively defined in respective sub-claims and/or in the following description.

The method for pre-processing speech according to the present invention, in particular in a method for recognizing speech, comprises the steps of receiving a speech signal, separating a spectrum of said speech signal into a given number of predetermined frequency sub-bands, analyzing said speech signal within each of said frequency sub-bands, thereby generating respective band-dependent acoustic feature data for each of said respective frequency sub-bands, which band-dependent acoustic feature data are at least in part representative for said speech signal with respect to a respective frequency sub-band, deriving band-dependent likelihoods for occurrences of speech elements or of sequences thereof within said speech signal based on said band-dependent acoustic feature data and/or a derivative thereof, analyzing said speech signal within said entire spectrum, thereby generating full-band acoustic feature data, which are at least in part representative for said speech signal with respect to said entire spectrum, deriving a full-band likelihood for occurrences of speech elements or of sequences thereof within said speech signal based on said full-band acoustic feature data and/or a derivative thereof, deriving an overall likelihood for occurrences of speech elements or of sequences thereof within said speech signal based on said band-dependent likelihoods and said full-band likelihood. Speech elements are e.g. words, phones, and sub-phonetic units.

Accordingly, a main idea of the invention can be summarized as follows: A spectrum of a speech signal is divided into a given number of predetermined frequency sub-bands and acoustic feature data are extracted in each frequency sub-bands, which are then used to determine band-dependent likelihoods in each frequency band. In parallel to this, the spectrum of said speech signal is analyzed in the entire frequency band, thereby generating additional acoustic feature data, which are then used to derive a likelihood term, which depends on the entire spectrum. The band-dependent likelihoods and the likelihood term are then combined to yield an overall likelihood by adding the different likelihood contributions of the band-dependent likelihoods and the likelihood term. The overall likelihood will be dominated by either the band-dependent likelihoods or a combination thereof or by the likelihood term depending on the type of noise in the speech signal, i.e. the model will adopt automatically to the type of noise. If a broadband noise is resident in said speech signal, then the likelihood term will dominate the overall likelihood, because a broadband noise robust front-end may be used. As broadband noise robust front-end any front-end may be used, which is robust against broadband noise, e.g. a frequency filtering front end may be used for feature extraction and thus the broadband noise can effectively be dealt with. However, if narrow band noise resides in the speech signal the likelihood contribution to the overall likelihood of the band-dependent likelihoods will dominate. This is because, e.g. only one of said frequency sub-bands may be distorted, and the band-dependent likelihoods from undistorted frequency sub-bands are dominating.

Preferable, when deriving said overall likelihood said band-dependent likelihoods are combined to a union model likelihood by determining the number of uncorrupted frequency sub-bands of said frequency sub-bands, and adding all possible combinations of products of different band-dependent likelihoods corresponding to respective frequency sub-bands. In other words, a certain number of corrupted frequency sub-bands is assumed, and the products depend on this number of assumed corrupted frequency sub-bands. The number of factors in each addend is equal to said given number of predetermined frequency sub-bands minus the number of frequency sub-bands assumed to be corrupted, i.e. distorted. The number of addends is equal to the number of frequency sub-bands, in the following equation denoted by N, over the number of frequency sub-bands minus the number of frequency sub-bands assumed to be distorted, in the following equation denoted by M, i.e. the number of addends is given by the binominal equation $$\text{number of addends} = \binom{N}{N-M}.$$

The different products are then preferably added to yield said union model likelihood. The union model likelihood will be dominated by the product containing band-dependent likelihoods, which are not or only a little distorted.

Further, preferably said band-dependent acoustic feature data ($O_1, \ldots, O_N$) comprise respective band-dependent mel-frequency cepstral coefficient features, which are based on mel-frequency cepstral coefficients and/or a derivative thereof derived from respective frequency sub-bands ($F_1, \ldots, F_N$). This means, mel-frequency cepstral coefficient feature extraction is performed in each of said frequency sub-bands.

Preferably, a predetermined broadband noise robustness technique is applied prior to deriving said likelihood term. This means, said full-band acoustic feature data may also comprise any other broadband noise robustness technique.

Said broadband noise robustness technique may be based on a frequency-filtering technique.

Also, said broadband noise robustness technique may be based on a method of spectral-subtraction.

Said full-band acoustic feature data may comprise filter bank energy features, which are based on filter bank energies derived from said entire spectrum. The term spectrum refers to a power density spectrum as typically used in speech recognition systems prior to deriving filter bank energies, i.e. using a mel-scaled filter bank. Also, the logarithm of the filter bank energies is taken as typical within a method for speech recognition.

Further, it may be advantageous that said full-band acoustic feature data comprise filtered filter bank energy features, which are based on filtered filter bank energies derived from said entire spectrum. This way, the influence of broadband noise can be effectively reduced. In other words, a frequency-filtering front end is applied to the full-band logarithmic filter bank energies. It should be noted, that all filter bank energies are logarithmic filter bank energies, hence, in the following the fact that the logarithm is taken may not be mentioned every time explicitly.

Further, preferably said full-band acoustic feature data comprise full-band mel frequency cepstral coefficient features, which are based on mel frequency cepstral coefficients and/or a derivative thereof derived from said entire spectrum. These features also contain information about the whole spectrum and can therefore advantageously be used, if no noise resides in said speech signal.

Said full-band acoustic feature data and/or said band-dependent acoustic feature data may also comprise PLP-linear prediction filter features, which are based on PLP-linear prediction filter coefficients. Generally, any other types of features can be applied, e.g. also logarithmic filter bank energy features directly or a derivative thereof, i.e. without filtering. Typical derivatives may include cepstral features.

Said full-band acoustic feature data may also comprise spectrally changed full-band mel-frequency cepstral coefficient features, which are generated by applying a method of spectral subtraction to said full-band mel-frequency cepstral coefficient features. Therefore, a method of noise estimation is performed detecting the noise resident in said speech signal. This technique also effectively deals with broadband noise.

In all cases, said band-dependent likelihoods and said likelihood term may be determined using a probability estimator. It is possible, that the probability estimator is trained with data containing speech corrupted by various types of noise.

Preferably, said filtered filter bank energies are derived from said filter bank energies by subtracting a first filter bank energy from a second filter bank energy, wherein said first filter bank energy corresponds to a first discrete frequency and said second filter bank energy corresponds to a second discrete frequency, lying two discrete frequency steps after said first filter bank energy.

A speech pre-processing system according to the invention, which is in particular integrated into a speech processing system, is capable of performing or realizing a method for pre-processing speech as defined above and/or the steps thereof. A computer program product according to the invention comprises a computer program means adapted to perform and/or to realize the method of pre-processing speech and/or the steps thereof, when it is executed on a computer, a digital signal processing means, and/or the like.

A computer readable storage medium according to the invention comprises a computer program product as defined above.

BRIEF DESCRIPTION OF THE SEVERAL VIEWS OF THE DRAWINGS

The invention and advantageous details thereof will be explained by way of an exemplary embodiment thereof in the following with reference to the accompanying drawings in which.

DETAILED DESCRIPTION OF THE INVENTION

Figure 1:
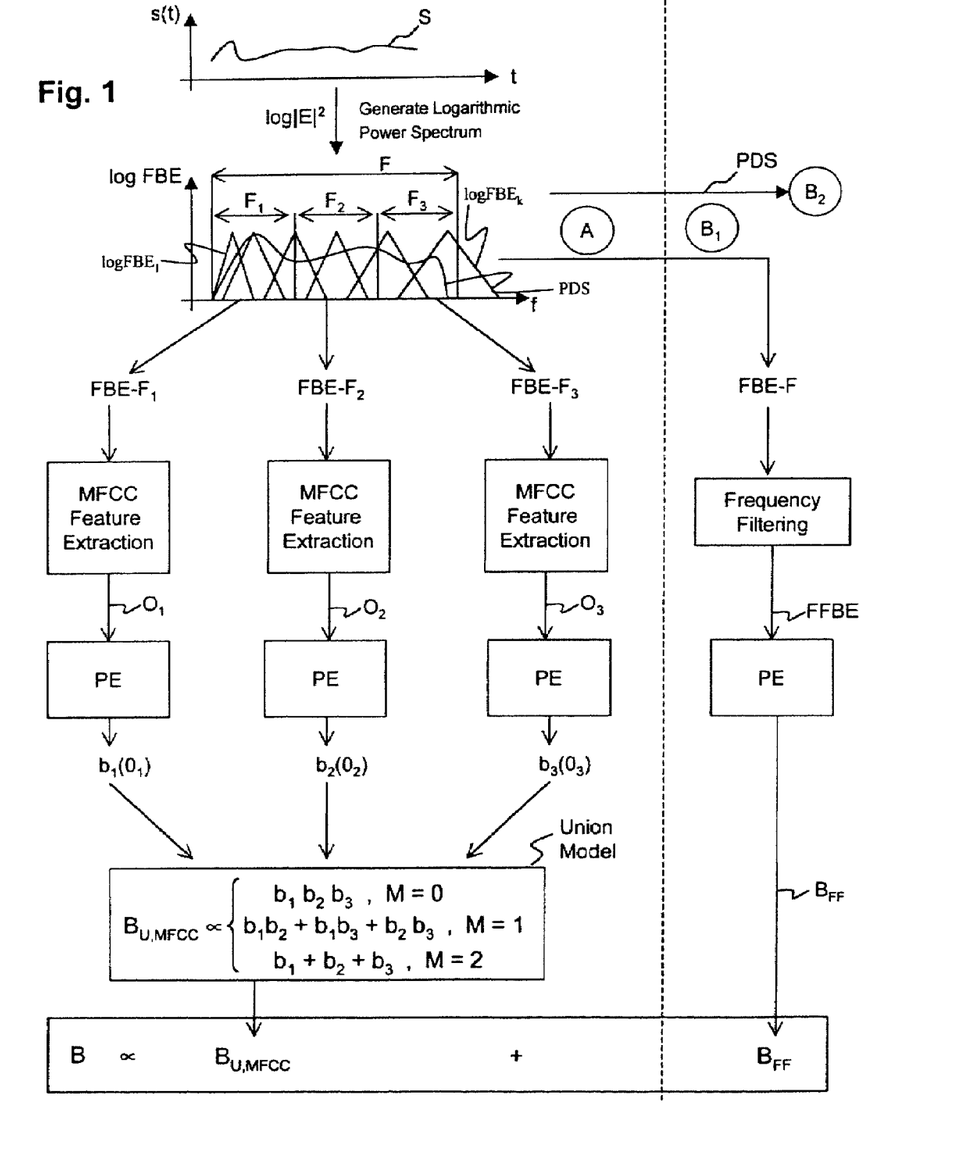
FIG. 1 is a block diagram showing the main steps according to the invention in a first embodiment.

In FIG. 1, first, the logarithmic power density spectrum PDS is derived by the following equation:

$$PDS = \log|E|^2. \tag{1}$$

Subsequently, filter bank energies log FBE are derived from the entire band, i.e. for the entire spectrum. Then, the filter bank energies log FBE from the entire band are separated into a predetermined number of frequency sub-bands, here, a first frequency sub-band $F_1$, a second frequency sub-band $F_2$, and a third frequency sub-band $F_3$. It should be noted that these are logarithmic filter bank energies log FBE as commonly used.

The results are first sub-band filter bank energies FBE-$F_1$, second sub-band filter bank energies FBE-$F_2$, and third sub-band filter bank energies FBE-$F_3$. From these filter bank energies mel-frequency cepstral coefficients are derived, i.e. a MFCC feature extraction is performed for each of the frequency sub-bands, i.e. the first sub-band filter bank energies FBE-FL, the second sub-band filter bank energies FBE-$F_2$, and the third sub-band filter bank energies FBE-$F_3$.

The result of the MFCC feature extraction for each frequency sub-band are band-dependent acoustic feature data, i.e. first sub-band acoustic feature data $O_1$ are derived from said first sub-band filter bank energies FBE-$F_1$, second sub-band acoustic feature data $O_2$ are derived from said second sub-band filter bank energies FBE-$F_2$, and third sub-band acoustic feature data $O_3$ are derived from said third sub-band filter bank energies FBE-$F_3$.

The derived sub-band acoustic feature data are then used as input for a probability estimator PE, which estimates band-dependent likelihoods within each subband acoustic feature data for speech elements corresponding to the speech signal. Speech elements may e.g. be words, phones, or sub-phonetic units. This means, the probability estimator PE estimates a first band-dependent likelihood $b_1$ from the first sub-band acoustic feature data $O_1$, further a second band-dependent likelihood $b_2$ from the second sub-band acoustic feature data $O_2$, and a third band-dependent likelihood $b_3$ from the third sub-band acoustic feature data $O_3$. Then, these band-dependent likelihoods are combined to a union model likelihood $B_{U,MFCC}$. The formula for calculating the union model likelihood $B_{U,MFCC}$ differs depending on the number M of frequency sub-bands assumed to be distorted:

$$B_{U,MFCC} \propto \begin{cases} b_1 b_2 b_3, & \text{if } M = 0 \\ b_1 b_2 + b_1 b_3 + b_2 b_3, & \text{if } M = 1 \\ b_1 + b_2 + b_3, & \text{if } M = 2 \end{cases} \quad (2)$$

The estimation of the union model likelihood $B_{U,MFCC}$ according to equation (2) is in the following referred to as union model, which is explained in detail in prior art document "Union: A new approach for combining sub-band observations for noisy speech recognition" by J. Ming and F. J. Smith, Speech Communication, Vol. 34, Issue 1-2, April 2001, pp 41-45. As far as the Union Model is concerned, please see this prior art document, the content of which is included herein by reference.

The union model likelihood $B_{U,MFCC}$ can be written as $$B_{U,MFCC}(O_t) \propto \sum_{n_1 n_2 n_{N-M}} b_i(O_{n_1}) b_i(O_{n_2}) \ldots b_i(O_{n_{N-M}}). \quad (3)$$

In the example of FIG. 1 the union model likelihood $B_{U,MFCC}$ is given by equation (2) as explained above, i.e. equation (3) simplifies to equation (2).

All of the above explanations with respect to the determination of the union model likelihood $B_{U,MFCC}$ are later referred to as part A, which is denoted as such in FIG. 1.

On the right-hand side of FIG. 1, a first embodiment to determine a frequency filter likelihood term $B_{FF}$ is depicted. In this first embodiment a logarithmic filter bank energy feature extraction log FBE is performed with respect to the entire spectrum F of the speech signal S. The result are full-band filter bank energy features FBE-F of the entire spectrum F.

Now, the full-band filter bank energy features FBE-F are subjected to a broadband noise robust front-end. It should be mentioned that any broadband noise robust front-end, i.e. any front-end which is robust against broadband noise, may be used. It may also be possible that no broadband noise robust front-end is used. However, in the embodiment of FIG. 1, a frequency-filtering front-end is used, which is described in detail in prior art document "Time and frequency filtering of filter-bank energies for robust HMM speech recognition" by C. Nadeu, D. Macho, and J. Hernando, Speech Communication, Vol. 34, Issue 1-2, April 2001, pp 93-114. As far as frequency filtering is concerned, please see this prior art document, the content of which is included herein by reference.

Turning back to FIG. 1, in order to deal with broadband noise the full-band filter bank energy features FBE-F are frequency filtered using the following equation:

$$f'(i) = f(i+1) - f(i-1). \quad (4)$$

Figure 3:
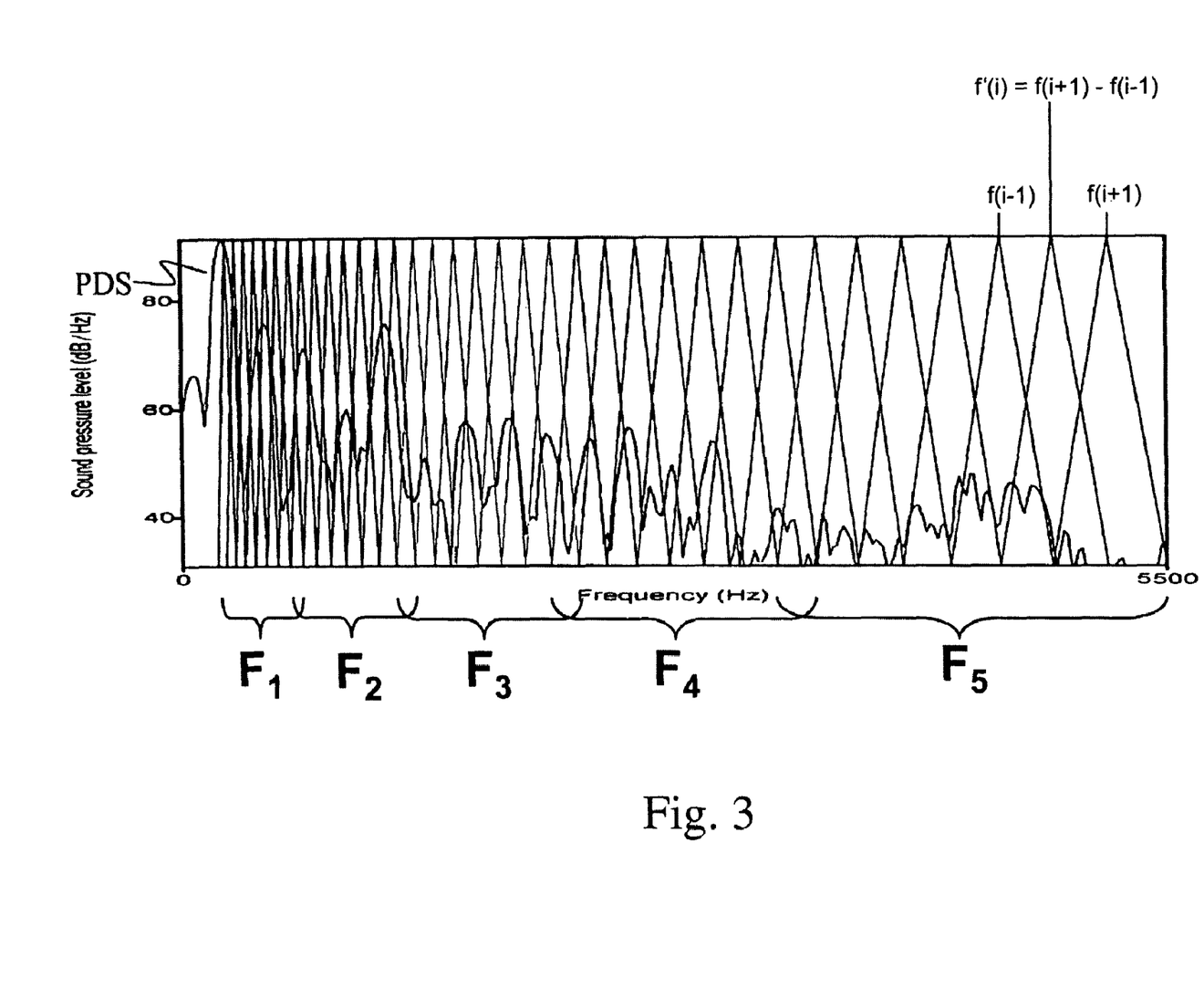
FIG. 3 shows a power density spectrum and mel-scaled filter bank.
Figure 4:
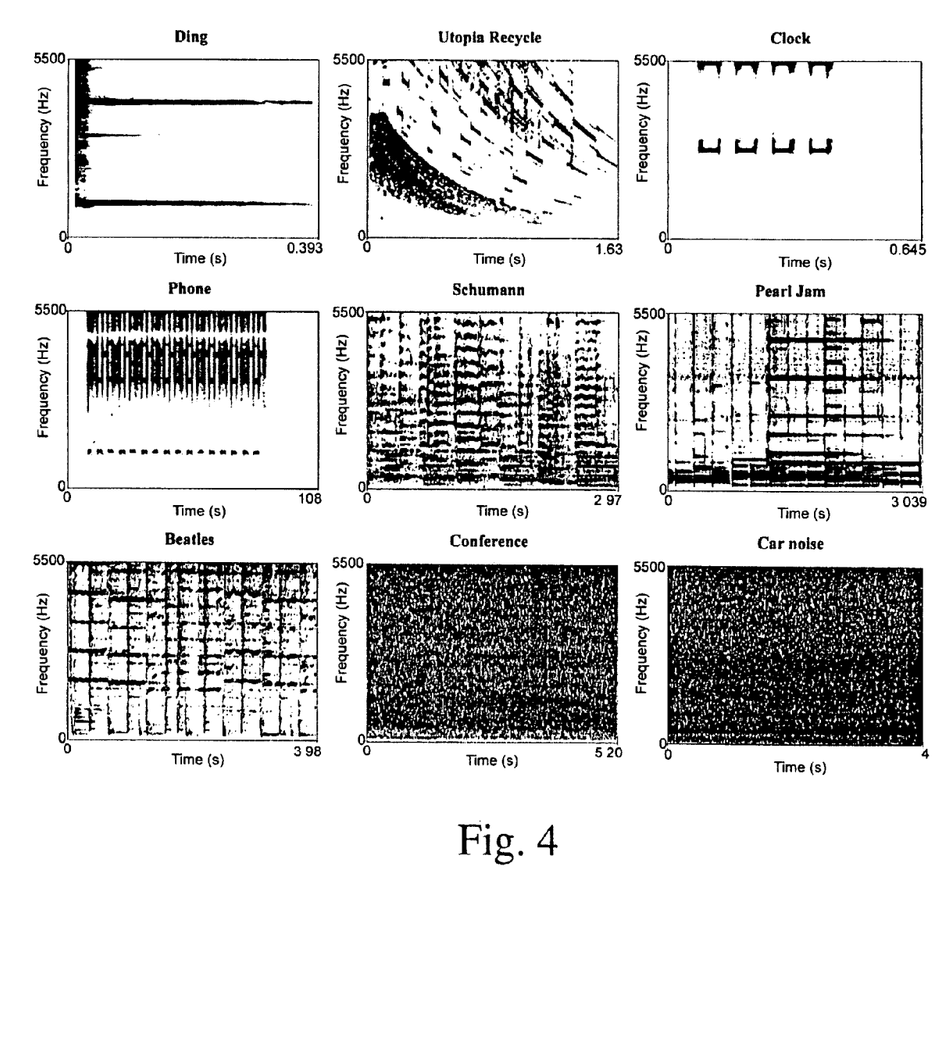
FIG. 4 shows spectrograms for different noise conditions.

The result is filtered filter bank energy features FFBE of the entire spectrum F. Eq. (4) means, that in order to obtain a filtered filter bank energy value of said filtered filter bank energy features FFBE at a certain discrete frequency i, the value of the previous filter bank energy $FBE_{i-1}$ corresponding to f(i-1) in eq. (4) is subtracted from the following filter bank energy $FBE_{i+1}$ corresponding to f(i+1) in eq. (4). The values of variable i in eq. (4) correspond to discrete frequencies as indicated in FIG. 3. The values of f(i+1) and f(i-1) correspond to coefficients of the corresponding Fourier transformation. This means, frequency filtering is done for each feature vector, independently of surrounding feature vectors. Feature vectors are thereby extracted every 10 ms from the speech signal S.

Equation (4) may also be written as follows:

$$FFBE_i = FBE_{i+1} - FBE_{i-1} \quad (5)$$

As mentioned, this means, a filtered filter bank energy value $FFBE_i$ at a certain frequency i may be calculated by subtracting a filter bank energy value $FBE_{i-1}$ corresponding to a previous frequency i-1 from a filter bank energy value $FBE_{i+1}$ corresponding to a following frequency i+1.

The filtered filter bank energy features FFBE are then used as an input to a probability estimator PE, which estimates the frequency filtered likelihood term $B_{FF}$.

Finally, the union model likelihood $B_{U,MFCC}$ and the frequency filtered likelihood term $B_{FF}$ are combined to an overall likelihood B which is given as:

$$B \propto B_{U,MFCC} + B_{FF}. \quad (6)$$

Figure 2:
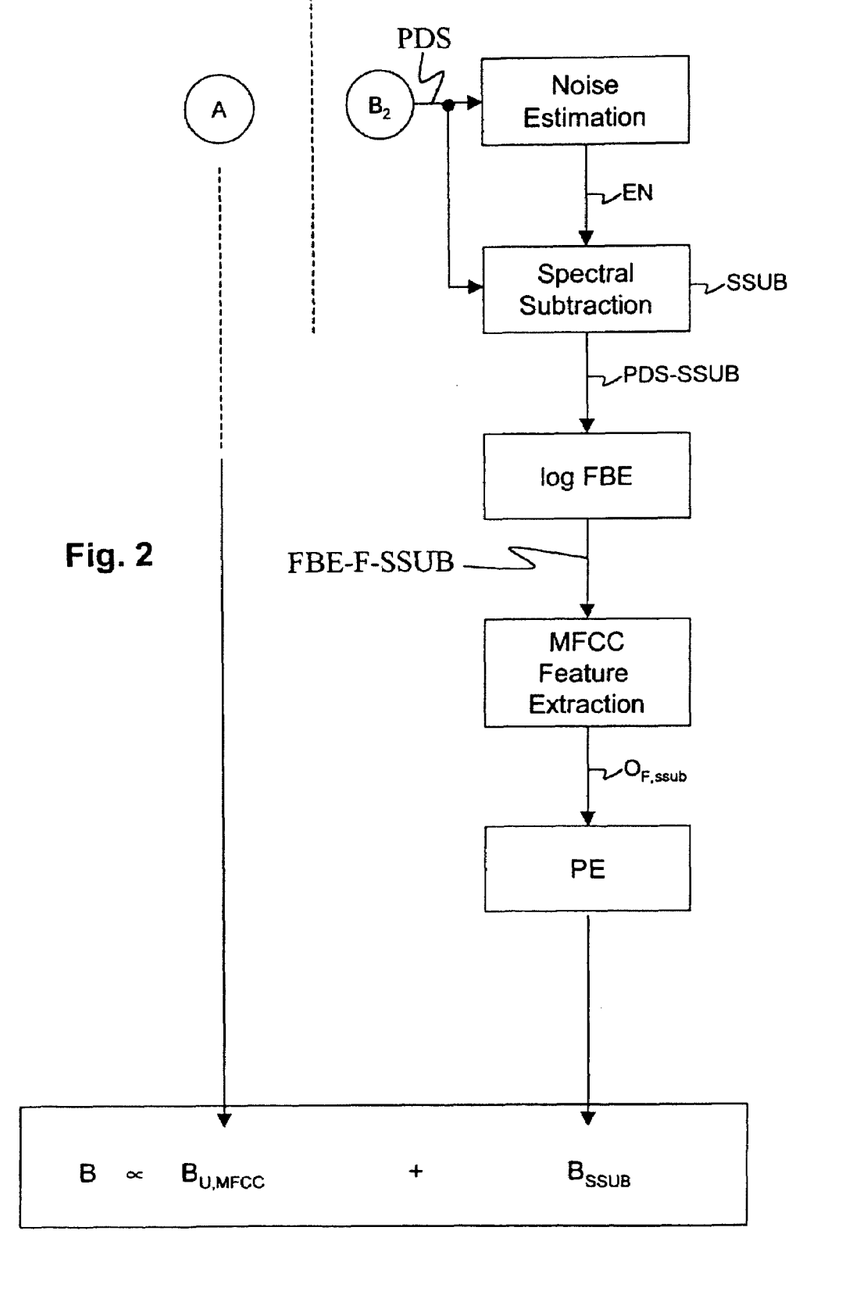
FIG. 2 shows a block diagram according to a second embodiment of the invention.

On the right-hand side of FIG. 2, a second embodiment $B_2$ to determine the overall likelihood is depicted. In this second embodiment a spectral subtraction likelihood term $B_{SSUB}$ is combined with the union model likelihood $B_{U,MFCC}$.

For determining this spectral subtraction likelihood term $B_{SSUB}$, first, the noise within the power density spectrum PDS, is determined. The power density spectrum PDS is derived from the speech signal S. The result of the noise estimation is estimated noise EN.

Then the method of spectral subtraction SSUB is applied, which uses as input the estimated noise EN and the power density spectrum PDS. The output of the method of spectral subtraction SSUB are power density spectrum spectral subtraction features PDS-SSUB.

These power density spectrum spectral subtraction features PDS-SSUB are subjected to a logarithmic filter bank energy feature extraction log FBE. Thereby, full-band spectrally subtracted filter bank energies FBE-F-SSUB are derived. These full-band spectrally subtracted filter bank energies FBE-F-SSUB are subjected to a mel-frequency cepstral coefficient MFCC feature extraction, wherein spectrally-changed full-band mel-frequency cepstral coefficient features $O_{F,SSUB}$ are generated. These spectrally-changed full-band mel-frequency cepstral coefficient features $O_{F,SSUB}$, are then used by the probability estimator PE to estimate the spectral subtraction likelihood term $B_{SSUB}$.

Finally, the union model likelihood $B_{U,MFCC}$, which is determined according to part A in FIG. 1, and the spectral subtraction likelihood term $B_{SSUB}$ are combined to the overall likelihood B as follows:

$$B \propto B_{U,MFCC} + B_{SSUB}. \quad (7)$$

FIG. 3 depicts the filter bank energy feature extraction log FBE. The basis forms the power density spectrum PDS. The frequency range of the power density spectrum PDS is separated into overlapping intervals, wherein a weighting function is assigned to each interval. The intervals are chosen according to the resolution of the human ear, i.e. a high density of intervals occurs within sensitive regions of the human ear, wherein a low density of intervals occurs within less sensitive regions of the human ear.

In the following further elucidations are given that may help a person skilled in the art to get a better understanding of the invention:

The invention performs an integration of broadband noise cancellation techniques into the Union Model approach. The Union Model approach is a powerful technique for dealing with narrow band noise, including non-stationary noises. However it is not very well suited for stationary broadband noises, where traditional techniques seem to perform better. Integration of such techniques into the Union Model concept will allow dealing with any kind of noise in any circumstances.

The theory behind the combination of Union Model with frequency filtering front-end, as an enhancement of the Union model concept for broadband but also for band-limited noise, assumes that the frequency-localized noise will corrupt only the nearby logarithmic Mel filter bank energies ($H(z)=z-z^{-1}$). However, if we assumed a system with 5 subbands (it was tested empirically that a bigger number of subbands could cause much of the spectral dependencies to be ignored, thus giving a poor phonetic discrimination), with very few noisy sub-bands it will be possible to corrupt the whole bandwidth if they are appropriately located. Therefore, although such combination of techniques could enhance the robustness against broadband noise, they became very unstable and unpredictable for band-limited noises. At this point it seems that the problem to find a technique that can deal with broadband and band-limited noise is still not solved.

The Union Model approach with MFCC as front-end, overcomes the signal quality deterioration by the assumption of band limited additive noise, and by effectively ignoring the contribution of the distorted signal band in the likelihood computation.

Example for N==3 and M==1:

$$B(O_1) \propto b_1^{MFCC} b_2^{MFCC} + b_1^{MFCC} b_3^{MFCC} + b_2^{MFCC} b_3^{MFCC}$$

The Frequency Filtering front-end applied to full-band based speech recognition achieve better results than the cepstral coefficients for speech corrupted by various types of wide-band real-world noises.

In order to combine both techniques in a proper way that allows to deal with both kind of noises, wide-band noise and band-limited noise, the Frequency Filtering front-end is integrated as an additional factor in the formula of the output probabilities calculation from the Union Model. The main purpose of this approach is to have a model that will use MFCC in case of narrow band noise, and Frequency Filtering for broadband noise, selecting automatically the most appropriate from the output probability calculation.

The double extraction of information (different sets of features from the same frequency band) can be seen as a diversity technique, which results in a more robust system.

From the implementation point of view, the following approach can be followed:

Union Model with N+1 streams, N for MFCC front-end (to calculate feature vectors for each subband) and 1 for Frequency Filtering approach, but applied to full-band (to calculate one single feature vector for the whole band):

$$B(O_1) \propto b_1^{MFCC} b_2^{MFCC} + b_1^{FMCC} b_3^{MFCC} + b_2^{MFCC} b_3^{MFCC} + B^{FF}$$

There is an additional technique for suppressing the acoustic added noise in speech called spectral subtraction, which proved to be very effective against stationary broadband noises. The main limitation of this method is its inability to cope with non-stationary noises. Since that is exactly one of the strengths of the Union Model, a combination of them will give benefits. Following the same idea as above, a Union Model with N+1 streams is obtained, N for MFCC front-end (to calculate feature vectors for each sub-band) and 1 for MFCC+Spectral Substraction applied to full-band (to calculate one single feature vector for the whole band):

$$B(O_1) \propto b_1^{MFCC} b_2^{MFCC} + b_1^{MFCC} b_3^{FMCC} + b_2^{MFCC} b_3^{MFCC} + B^{MFCC+SS}$$

The same idea could be applied for any broadband noise robustness technique, with a general output probability calculation as:

$$B(O_1) \propto b_1^{MFCC} b_2^{MFCC} + b_1^{MFCC} b_3^{MFCC} + b_2^{MFCC} b_3^{MFCC} + B^{BNRF}$$, where BNRF stands for Broadband Noise Robust Front-end.

Also, the following elucidations may be helpful to get a better understanding of the invention, which may be described as an extension of Union Model approach for broadband noise, with an additional stream for Frequency Filtering full-band front-end.

In the following a brief abstract of the invention is given.

The invention introduces an extension of the union model approach that allows robustness against broadband noise. A number of recent studies reveal that union model approach with Mel-Frequency Cepstral Coefficients (MFCCs) as front-end, offers robustness to band limited corruption, without requiring information about the noise. On the other hand, frequency filtering front-end applied to full-band based speech recognition, is proved to achieve better results than cepstral coefficients for speech corrupted by various types of broadband real-world noises. In order to combine these techniques in a proper way that allows dealing with both kinds of noises, wide-band noise and band limited noise, frequency filtering front-end on full-band is integrated as an additional stream in the union model. The double extraction of information, i.e. different sets of features from the same frequency band, can be seen as a diversity technique, which results in a more robust system.

In the following an introduction to the invention is given.

Automatic Speech Recognition systems are exposed to a wide range of noises, in terms of spectral characteristics. In a real environment, partial frequency-band corruptions, e.g. telephone, clock, etc., coexist with non-stationary noise, e.g. music, as well as with unknown broadband noise, e.g. car noise, conference background noise, etc.

As long as sub-band based speech recognition methods is concerned, the union model has shown to be a powerful technique for dealing with narrow-band noise, especially non-stationary noises. However, as we will see in the experiments explained below, it is not very well suited for stationary broadband noises, where traditional techniques seem to perform better. The main drawback of such techniques is that they usually require some previous knowledge about the noise. Recently, frequency filtering front end for the full-band approach has proved to be a clear alternative to the cepstral coefficients for speech recognition in presence of unknown broadband noise.

From a robust speech recognition point of view, it will be desirable to have a system, which is able to deal with as many types of noise as possible. A combination of the probabilistic union model and the frequency filtering technique is known, which has the advantage of dealing with both frequency localized noise and wide band noise, but only under very specific circumstances as we will see later. At this point, it seems that the problem to find a technique that can deal with broadband and band limited noise is still to be solved.

The invention consist in integrating frequency filtering front-end applied to full-band, as an additional stream in the union model, being represented in the sum of the output probability calculation as an independent term. Basically the goal is to have a model that will use cepstral coefficients combined with subband approach in case of narrow-band noise, and frequency filtering with full-band approach for broadband noise, selecting automatically the most appropriate from the output probability calculation. The novel combination of both techniques, make the system robust against different sorts of noises, and as we will see in the results, for some special cases it is even better than using the individual corresponding technique.

In the following the Probabilistic Union Model will be briefly described.

The union model is known for likelihood combination in the presence of band limited additive noise. Essentially, the signal is split up in N frequency bands. Under the assumption that M (M<N) bands are distorted, the likelihood, i.e. total output probability, can be computed as the sum of the likelihood contributions of all N-M bands combinations. The principal idea is that if a combination includes the corrupted band, then its likelihood is very low, and therefore the sum of the individual likelihood contributions is dominated by the one combination of bands where the noisy band is excluded. The interesting property of the union model is now that it is not necessary to know which of the bands is corrupted.

For instance if we assumed N=5 bands and M=1 of them are noisy, the output probability calculation will be:

$$B(o_1) \propto b_1 b_2 b_3 b_4 + b_1 b_2 b_3 b_5 + b_1 b_2 b_4 b_5 + b_1 b_3 b_4 b_5 + b_2 b_3 b_4 b_5 \quad (I)$$

With this idea in mind a previous full-band baseline system based on triphone HMMs with diagonal covariance and 20 feature vector, i.e. 6 MFCC, 7 ΔMFCC, and 7 ΔΔMFCC, for each frame has been trained. The multi-band system has 5 sub-bands corresponding to 5 streams with 8 feature vector each, i.e. 4 MFCC, 4 ΔMFCC. Both systems are trained on clean speech.

The database used for evaluation contains 100 German addresses and city names recorded by 15 speakers. The experiments presented in Table 1 have shown similar performance achievements for other databases, in particular for commands and control task with 350 vocabulary size.

The first two columns in Table 1 reproduce the results from the evaluation of both systems under various noise conditions. Four band limited noises, i.e. two artificial and two real noises, three pieces of music and two wide-band noises are tested together with clean condition during the experiments. Spectrograms of these noises can be found in FIG. 1. From the results we can confirm that clean speech is better characterized by full-band approach, since there is no band corruption, although the variation regarding recognition rate is very small. For the entire band limited noises, it is possible to appreciate a high improvement in the union model approach with respect to the full-band. Music presents a different behavior depending on the degree of concentration of noise in certain subbands. At the same time, the performance in broadband noises decreases drastically.

Experiments in Table 1 correspond to different values of M, i.e. number of assumed noisy bands, obtained from the best recognition rates. For selecting an appropriate order to accommodate the corrupted subbands within an observation, given no knowledge about the corrupting noise, we can rely on the automatic order selection algorithm proposed in prior art.

In the following, more details are given with respect to Frequency Filtering.

The frequency filtering front-end has been successfully used as an alternative to the cepstral coefficients for noisy speech recognition. The idea is to generate a set of feature parameters by filtering the logarithm filter bank energies (FBE), with an effect of decorrelation and the additional advantage of lying in the frequency domain.

In an inventive implementation, the FIR filter with transfer function $z-z^{-1}$ is applied to 15 logarithmic FBE, and delta parameters are calculated, resulting in a 45 feature vector.

The third column in Table 1 presents the experiments carried out for the noise conditions mentioned earlier, including clean speech. In clean conditions, the results are comparable to the full-band approach with MFCC. As it was expected, a significant improvement is achieved for music and broadband noise, while performance for narrow band noises is pretty low compared with any of the previous systems. Frequency filtering success is based, to some extent, on its ability for noise cancellation between the filter banks, based on the assumption that the noise is stationary in the frequency domain, which is not the case for narrow-band noises.

The following section is concerned with the Union Model with Frequency Filtering front end.

The frequency filtering is used to produce a 9 feature vector for each of the 5 subband in the probabilistic union model, instead of MFCC. This aims to benefit from the good noise localization capability that offers this technique, which should isolate the noise in the corresponding subbands, leaving the others unaffected, in case of narrow-band noise. At the same time, it should provide robustness against broadband noise.

The theory behind the combination of union model with frequency filtering front-end, as an enhancement of the union model concept for broadband but also for band limited noise, assumes that the frequency localized noise will corrupt only the nearby logarithmic Mel filter bank energies ($H(z)=z-z^{-1}$). However, if we assumed a system with 5 subbands—it was tested empirically that a bigger number of subbands could cause much of the spectral dependencies to be ignored, thus giving a poor phonetic discrimination—with very few noisy subbands it will be possible to corrupt the whole bandwidth if they are appropriately located. Therefore, although such combination of techniques could enhance the robustness against broadband noise, it becomes very unstable and unpredictable for band limited noises.

The fourth column in Table 1 presents a similar behavior of this scheme compared to the previous one, revealing the same incapability to deal with narrow-band noises. The main reason is that frequency filtering technique spreads the noise in the nearby bands with the possibility of affecting more subbands than just the original ones. That would not cause so much problem if we could increase the number of subbands of the system to make the contribution of one subband insignificant, but that would influence negatively in the phonetic discrimination of the model.

As mentioned, the invention uses an additional stream for Frequency Filtering full band front end, which will be explained more detailed in the following.

From the above-described experiments the following remarks can be deduced:

The union model approach with MFCC as front end, overcomes the signal quality deterioration by the assumption of band limited additive noise, and by effectively ignoring the contribution of the distorted signal band in the likelihood computation.

The frequency filtering front end applied to full-band based speech recognition achieves better results than the cepstral coefficients for speech corrupted by various types of wide-band real-world noises.

As an attempt to merge these two schemes in a single method suitable for dealing with both possibilities of noise conditions, wide-band noise and band limited noise, frequency filtering front-end is integrated as an additional factor in the formula of the output probabilities calculation from the union model, i.e. integrated as an independent stream in the union model.

Referring to the expression (I), the new output probability will look like:

$$B(o_1) \propto b_1 b_2 b_3 b_4^{MFCC} + \ldots + b_2 b_3 b_4 b_5^{MFCC} + B^{Freq.Filt.} \quad (II)$$

It is expected that for broadband noises the contribution of the subbands terms will be insignificant, compared with the magnitude of the last term. Same reasoning applies for narrow-band noises, the term corresponding to full-band with frequency filtering front-end should have almost no influence in the output probability calculation.

The above model is implemented into an HMM speech recognition system based on triphones, combining 5 subbands observations, in terms of MFCC front-end, with a full-band observation, in terms of frequency filtering front-end, in a 6 streams structure at the frame level. That means each observation vector at time t can be split into 6 independent data streams, and the formula for computing the output distributions in the Baum-Welch Re-estimation algorithm for the problem of parameter estimation can be written as, $$B(o_t) = \prod_{s=1}^{s=6} \sum_{m=1}^{m=2} c_{sm} N\left(o_{st}; \mu_{sm}, \sum_{sm}\right) \quad (III)$$

where there are 2 mixtures components in each stream, $c_{sm}$ is the weight of the m'th component, and $N(.;\mu,\Sigma)$ is a multivariate Gaussian with mean vector $\mu$ and covariance matrix $\Sigma$. The weight of each of the 6 streams is set to 1. The feature vector for each of the 5 subband streams is composed of 4 MFCC and 4 AMFCC, i.e. 8 features each. The fullband stream contains a 45 feature vector, resulting from the application of FIR filter with transfer function $z-z^{-1}$ to 15 logarithmic FBE, and the estimation of delta parameters.

Results from the fifth column in Table 1 reproduce the evaluation of this method for all the noises that are object of an investigation. As we can observe from the figures, and from comparison with the second and third columns of the table, it seems that the expectations become truth for all the noise conditions. In deed, for some of them, the recognition rates are even better that any of the individual systems. As an example, if we take one of the band limited noise, e.g. clock, the accuracy with frequency filtering front-end and full-band is very low, 20.7%, while with the union model and MFCC front end it is quite high, 92.2%. For the same noise, the new model outperforms the best result with a recognition rate of 94.9%. The same behavior holds also for music and broadband noise.

Now, some final remarks are given.

Speech recognition in the presence of noise is a difficult problem of great practical importance. There are very promising algorithms in the literature, designed to enhance speech recognition robustness against certain noise conditions. The probabilistic union model for subband combination appeared recently as an answer for speech recognition involving partial, unknown frequency band corruption. On the other hand, the front-end derived from frequency filtering have been successfully used in both clean, and noisy HMM speech recognition in the last years. The invention proposes a novel use of the union model for combining the above techniques in streams tuned for specific noise conditions, i.e. narrow-band noise and broadband noise.

The results presented below validate the new technique as an efficient method for dealing with the variety of noises, i.e. from the spectral characteristic point of view, that can be found in a real environment.

During the research, it has been observed, that for particular narrow-band noises, the order of the union model, i.e. the number of assumed noisy bands, M, that gives better performance, increases when such model is integrated with a frequency filtering full-band stream. For instance, for the artificial narrow-band noise "ding", the best recognition rate with the classical union model is given for M=1. However, the new system, i.e. 5 MFCC subbands streams plus 1 frequency filtering stream, performs best with M=2. The reason can be that in the last case the system already has some broadband information in the sixth stream, especially information related to the joint probability distribution, and therefore it is preferable to avoid as many noisy subbands as possible. These observations indicate the convenience of selecting the appropriate order to accommodate corrupted subbands within an observation. An algorithm for automatically selecting the order based on an optimality criterion, i.e. order that produce a state duration pattern most similar to the pattern obtained for clean utterances, provided excellent results.

There is still an open question; it could be the case that we would have both kinds of noises at the same time. Let's say, a very common situation could be a relatively wide band noise in the background, e.g. music, and an unexpected band limited noise, e.g. telephone ringing. One solution could be the combination of union model with conventional noise reduction techniques, especially those that involve estimation of the noise characteristic, very well suited for stationary noise.

TABLE 1

| Word Recognition Accuracy | | MFCC Full band | Frequency Filtering Full band | MFCC Multi band | Frequency Filtering Multi band | Frequency Filtering Full band MFCC Multi band |
|---|---|---|---|---|---|---|
| | Clean | 99.1% | 99.4% | 97.6% | 98.2% | 99.4% |
| Artificial noise | Ding 0 dB | 67.9% | 18.3% | 84.4% | 25.5% | 90.1% |
| | 10 dB | 88.3% | 57.7% | 92.8% | 56.2% | 96.4% |
| | Utopia 0 dB | 48.6% | 43.5% | 54.7% | 41.4% | 64.3% |
| | Recycle 10 dB | 83.5% | 80.2% | 86.8% | 75.1% | 91.0% |

TABLE 1-continued

| Word Recognition Accuracy | | MFCC Full band | Frequency Filtering Full band | MFCC Multi band | Frequency Filtering Multi band | Frequency Filtering Full band MFCC Multi band |
|---|---|---|---|---|---|---|
| Real noise | Clock 0 dB | 80.8% | 20.7% | 92.2% | 66.4% | 94.9% |
| | Phone 0 dB | 63.1% | 6.6% | 88.9% | 35.7% | 94.0% |
| Music interference | Schumann 10 dB | 89.2% | 91.6% | 87.7% | 94.0% | 94.3% |
| | Pearl Jam 10 dB | 88.3% | 92.2% | 88.0% | 92.2% | 92.5% |
| | Beatles 10 dB | 85.9% | 77.5% | 70.3% | 73.0% | 81.4% |
| Wide band | Conference 10 dB | 85.0% | 88.6% | 67.3% | 88.9% | 88.9% |
| | Car noise 3.6 dB | 45.6% | 68.2% | 29.1% | 64.6% | 72.7% |

Table 1: Recognition rates in WER for the different noise conditions.

REFERENCE SYMBOLS

A steps for determining the union model likelihood $B_{U\_MFCC}$
$B_1$ first embodiment
$b_1$ first band-dependent likelihood
$b_1, \ldots, b_N$ band-dependent likelihoods
$B_2$ second embodiment
$b_2$ second band-dependent likelihood
$b_3$ third band-dependent likelihood
$B_{FF}$ frequency filter likelihood term
$B_{SSUB}$ spectral subtraction likelihood term
$B_{U\_MFCC}$ union model likelihood
EN estimated noise
F spectrum
$F_1$ first frequency sub-band
$F_1, \ldots, F_n$ frequency sub-bands
$F_2$ second frequency sub-band
$F_3$ third frequency sub-band
$FBE_1, \ldots$, $1^{st}$ filter bank energy to $k^{th}$ filter bank energy
FBE-F filter bank energies of the entire spectrum F
FBE-$F_1$ first sub-band filter bank energies
FBE-$F_2$ second sub-band filter bank energies
FBE-$F_3$ third sub-band filter bank energies
FBE-F-SSUB full-band spectrally-subtracted filter bank energies
$FBE_{i+1}$ second filter bank energy
$FBE_{i-1}$ first filter bank energy
FFBE filtered filter bank energy features of the entire spectrum F
log FBE logarithmic filter bank energies
M number of corrupted frequency sub-bands
N number of frequency sub-bands $F_1, \ldots, F_N$
$O_1$ first sub-band acoustic feature data
$O_1, \ldots, O_n$ band-dependent acoustic feature data
$O_2$ second sub-band acoustic feature data
$O_3$ third sub-band acoustic feature data
$O_{F\_SSUB}$ spectrally-changed full-band mel-frequency cepstral coefficient
P1, ..., Pm speech elements
PDS power density spectrum
PDS-SSUB power density spectrum spectral subtraction features
S speech signal

The invention claimed is:

1. A method for pre-processing speech, comprising the steps of:

receiving a speech signal;

separating an entire spectrum of said speech signal into a number of predetermined frequency sub-bands;

analyzing said speech signal within each of said frequency sub-bands;

generating respective band-dependent acoustic feature data for each of said respective frequency sub-bands, the band-dependent acoustic feature data being at least in part representative of said speech signal with respect to a respective frequency sub-band;

deriving band-dependent likelihoods for occurrences of speech elements or of sequences thereof within said speech signal based on said band-dependent acoustic feature data;

analyzing said speech signal within said entire spectrum;

generating full-band acoustic feature data, the full-band acoustic feature data being at least in part representative of said speech signal with respect to said entire spectrum;

deriving a full-band likelihood for the occurrences of speech elements or of sequences thereof within said speech signal based on said full-band acoustic feature data; and deriving an overall likelihood for the occurrences of speech elements or of sequences thereof within said speech signal based on said band-dependent likelihoods and said full-band likelihood.

2. The method according to claim 1, wherein deriving said overall likelihood includes combining said band-dependent likelihoods to a union model likelihood by determining a number of uncorrupted frequency sub-bands of said frequency sub-bands and adding all possible combinations of products of the band-dependent likelihoods corresponding to the respective frequency sub-bands.

3. The method according to claim 1, wherein the step of generating the band-dependent acoustic feature data comprises generating said band-dependent acoustic feature data that include respective band-dependent mel-frequency cepstral coefficient features, which are based on mel-frequency cepstral coefficients derived from the respective frequency sub-bands.

4. The method according to claim 1, further comprising:
applying a predetermined broadband noise robustness technique prior to deriving said full-band likelihood.

5. The method according to claim 4, wherein the step of applying the predetermined broadband noise robustness technique comprises applying said broadband noise robustness technique based on a frequency-filtering technique.

6. The method according to claim 4, wherein the step of applying the predetermined broadband noise robustness technique comprises applying said broadband noise robustness technique based on a method of subtraction.

7. The method according to claim 1, wherein the step of generating the full-band acoustic feature data comprises generating said full-band acoustic feature data that include filter bank energy features, which are based on filter bank energies derived from said entire spectrum.

8. The method according to claim 1, wherein the step of generating the full-band acoustic feature data comprises generating said full-band acoustic feature data that include filtered filter bank energy features, which are based on filtered filter bank energies derived from said entire spectrum.

9. The method according to claim 1, wherein the step of generating said full-band acoustic feature data comprises generating said full-band acoustic feature data that include full-band mel-frequency cepstral coefficient features, which are based on mel-frequency cepstral coefficients derived from said entire spectrum.

10. The method according to claim 1, wherein the step of generating said full-band acoustic feature data and/or said band-dependent acoustic feature data comprises generating said full-band acoustic feature data and/or said band-dependent acoustic feature data that include PLP-linear prediction filter features, which are based on PLP-linear prediction filter coefficients.

11. The method according to claim 1, wherein the step of generating the full-band acoustic feature data comprises generating said full-band acoustic feature data that include spectrally-changed full-band mel-frequency cepstral coefficient features which are generated by applying a method of spectral subtraction to said full-band mel-frequency cepstral coefficient features.

12. The method according to claim 1, further comprising:
determining, using a probability estimator, said band-dependent likelihoods and said full-band likelihood.

13. The method according to claim 1, further comprising:
deriving filtered filter bank energies from filter bank energies by subtracting a first filter bank energy from a second filter bank energy, wherein said first filter bank energy corresponds to a first discrete frequency and said second filter bank energy corresponds to a second discrete frequency, lying two discrete frequency steps after said first filter bank energy.

14. A speech pre-processing system, comprising:
means for receiving a speech signal;
means for separating an entire spectrum of said speech signal into a number of predetermined frequency sub-bands;
means for analyzing said speech signal within each of said frequency sub-bands;
means for generating respective band-dependent acoustic feature data for each of said respective frequency sub-bands, the band-dependent acoustic feature data being at least in part representative of said speech signal with respect to a respective frequency sub-band;
means for deriving band-dependent likelihoods for occurrences of speech elements or of sequences thereof within said speech signal based on said band-dependent acoustic feature data;
means for analyzing said speech signal within said entire spectrum;
means for generating full-band acoustic feature data, the full-band acoustic feature data being at least in part representative of said speech signal with respect to said entire spectrum;
means for deriving a full-band likelihood for the occurrences of speech elements or of sequences thereof within said speech signal based on said full-band acoustic feature data, and
means for deriving an overall likelihood for the occurrences of speech elements or of sequences thereof within said speech signal based on said band-dependent likelihoods and said full-band likelihood.

15. A computer readable storage medium, having embedded therein computer executable instructions, wherein the instructions, when executed by a processor, cause the processor to perform a method comprising:
receiving a speech signal;
separating an entire spectrum of said speech signal into a number of predetermined frequency sub-bands;
analyzing said speech signal within each of said frequency sub-bands;
generating respective band-dependent acoustic feature data for each of said respective frequency sub-bands, the band-dependent acoustic feature data being at least in part representative of said speech signal with respect to a respective frequency sub-band;
deriving band-dependent likelihoods for occurrences of speech elements or of sequences thereof within said speech signal based on said band-dependent acoustic feature data;
analyzing said speech signal within said entire spectrum;
generating full-band acoustic feature data, the full-band acoustic feature data being at least in part representative of said speech signal with respect to said entire spectrum;
deriving a full-band likelihood for the occurrences of speech elements or of sequences thereof within said speech signal based on said full-band acoustic feature data; and
deriving an overall likelihood for the occurrences of speech elements or of sequences thereof within said speech signal based on said band-dependent likelihoods and said full-band likelihood.

* * * * *